United States Patent [19]
Appleyard et al.

[11] Patent Number: 5,579,884
[45] Date of Patent: Dec. 3, 1996

[54] PRESS BRAKE SAFETY APPARATUS

[75] Inventors: Thomas J. Appleyard, 294 Hancock Street, Doubleview Western Australia, Australia; Adrian J. Bajada, Woodlands, Australia; John W. Rose, Doubleview, Australia

[73] Assignee: Thomas John Appleyard, Doubleview, Australia

[21] Appl. No.: 230,401

[22] Filed: Apr. 20, 1994

(Under 37 CFR 1.47)

[30] Foreign Application Priority Data

Oct. 18, 1991 [AU] Australia .................. PK8972
Oct. 16, 1992 [AU] Australia .................. 27084/92

[51] Int. Cl.$^6$ ........................................ F16P 3/14
[52] U.S. Cl. .................. 192/130; 192/129 A; 100/53
[58] Field of Search .................. 192/130, 129 A, 192/133, 134; 100/53

[56] References Cited

U.S. PATENT DOCUMENTS

| | | | |
|---|---|---|---|
| 2,241,556 | 5/1941 | MacMillin et al. | 192/130 |
| 4,166,369 | 9/1979 | Nakajima | 100/53 X |
| 4,660,703 | 4/1987 | Filcich et al. | 192/150 |

FOREIGN PATENT DOCUMENTS

| | | | |
|---|---|---|---|
| 0146460 | 6/1985 | European Pat. Off. | 192/129 A |
| 2540224 | 8/1984 | France | 192/134 |
| 2750234 | 1/1979 | Germany | 192/133 |
| 3920111 | 1/1991 | Germany | 192/129 A |
| 509928 | 7/1939 | United Kingdom | 192/130 |

OTHER PUBLICATIONS

"The Hoffman Electronic Controlled Automatic Safety Guard for Power Presses", Hoffman Engineering Corporation, pp. 2–3, Apr. 1952.

*Primary Examiner*—Rodney H. Bonck
*Attorney, Agent, or Firm*—William L. Feeney; Kerkam, Stowell, Kondracki & Clarke, P.C.

[57] ABSTRACT

A press brake safety apparatus for use on a press brake (10) of the kind having a moving blade (18) having a leading edge (36) and a platform (38) against which an item (42) may be pressed, the safety apparatus comprising at least one beam (26) of light mounted at a level marginally forward of and substantially parallel to the leading edge (36) so as to move with the blade (18), the interruption of the or each beam (26) causing the movement of the blade (18) to stop and thereby halting operation of the press brake (10) without the leading edge (36) contacting the item (42).

9 Claims, 10 Drawing Sheets

PRESS BRAKE SAFETY APPARATUS

The present invention relates to a press brake safety apparatus.

Presently, there may be provided on a press brake an arrangement of infra red light curtains lying in a plain substantially parallel to that defined by the blade of the press brake.

Breaking this light curtain at any level will halt operation of the press brake. Such arrangements serve to prevent an operator having any part of their body, particularly their hands, near or under the blade when the pressing operation takes place. In addition to the light curtains the press operates in an incremental manner so that movement of the blade over an increment requires a positive action, such as depressing a foot pedal. This too is intended to increase safety.

This present arrangement results in numerous unnecessary interruptions in the operation of the press brake. In particular, breaking the light curtain at a point where no danger is possible, such as 450 mm from the blade, or during the slow incremental progress of the blade, will cause an unnecessary interruption in the operation of the press brake.

Also, failure of the light curtain in some manner can leave the operator unaware and therefore in danger of injury.

At present, a rear side of the blade is required to be enclosed by a mechanical and physical barrier. This precludes access to the rear of the blade during operation thereof thereby further reducing the efficiency and efficacy of the press brake. In addition, this requirement can limit the type of jobs performed by the press brake.

The present invention attempts to overcome each of the abovementioned problems associated with the prior art.

In accordance with one aspect of the present invention there is provided a press brake safety apparatus for use on a brake press of the kind having a moving blade having a leading edge and a platform against which an item may be pressed, the safety apparatus comprising at least one beam of light mounted at a level marginally forward of and substantially parallel to the leading edge so as to move with the blade, the interruption of the beam causing the movement of the blade to stop and thereby halting operation of the press brake without the leading edge contacting the item.

Preferably, a single beam is mounted each side of the blade and running substantially parallel thereto.

Still preferably, interruption of the beam will also remit in the lighting of warning lights mounted on the press brake. Also, the beam will be electronically linked to a form of programmable logic controller such that the function of the brake press may be governed thereby.

The present invention will now be described, by way of example only, with reference to the following drawings.

Figure 1:
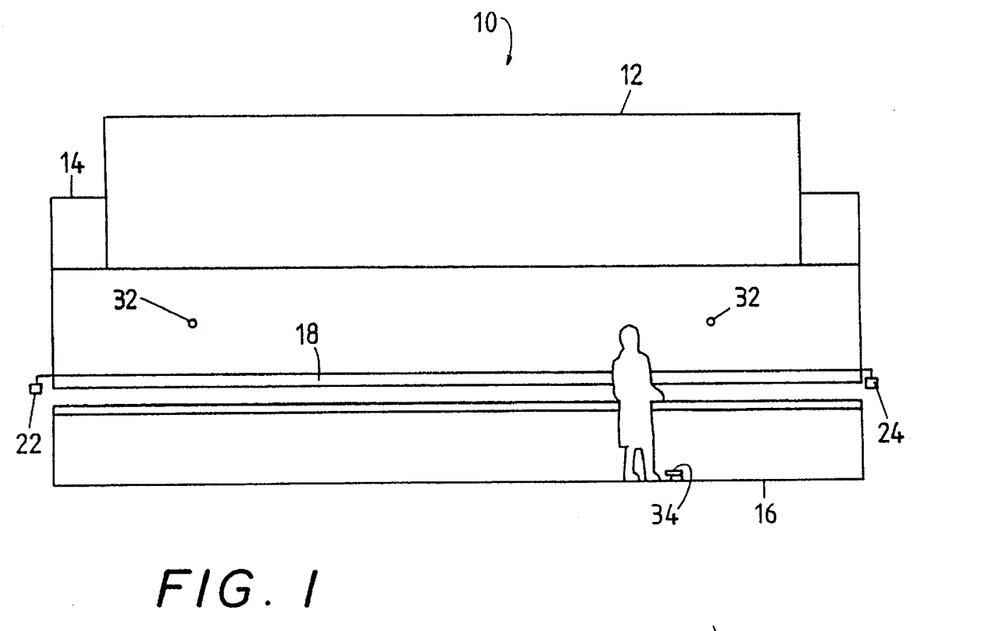
FIG. 1 is a front view of a press brake incorporating the safety apparatus of the present invention.

In FIG. 1 there is shown a press brake 10 comprising a housing 12, a blade frame 14 and a base 16. The blade frame 14 has provided therein a blade 18 and two pivot means 20, as can be see in FIG. 2. The two pivot means 20 are located one at each end of the blade 18.

Both a light emitter means 22 and a light receiving means 24 are mounted to each pivot means 20 and as such are rigidly linked to the blade frame 14. The light emitter means 22 and light receiving means 24 linked to each pivot means 20 are arranged so as to be opposed to the light receiving means 24 and light emitter means 22 respectively linked to the other pivot means 20, as can be best seen in FIG. 2.

Figure 2:
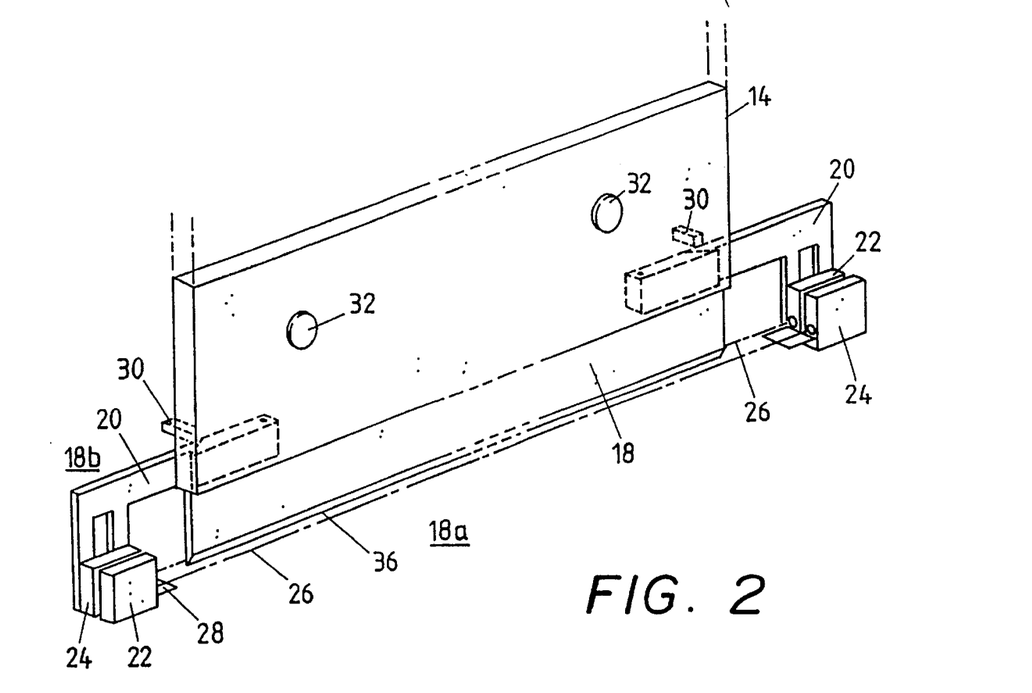
FIG. 2 is an upper perspective view of part of the safety apparatus and press brake of FIG. 1.

A beam of light 26 passes between each opposed light emitter means 22 and light receiving means 24. Each light emitter means 22 and light receiving means 24 has a light scatter guard 28 provided thereon. The beams 26 run substantially parallel to the blade 18 on a front side 18a and a rear side 18b thereof.

A number of over-ride means in the form of switches 30 are also provided on the blade frame 14. The blade frame 14 has a number of warning means in the form of lights 32 provided thereon.

The press brake 10 incorporates a manual operator means in the form of a foot switch 34, as can be seen in FIG. 1.

Figure 3A:
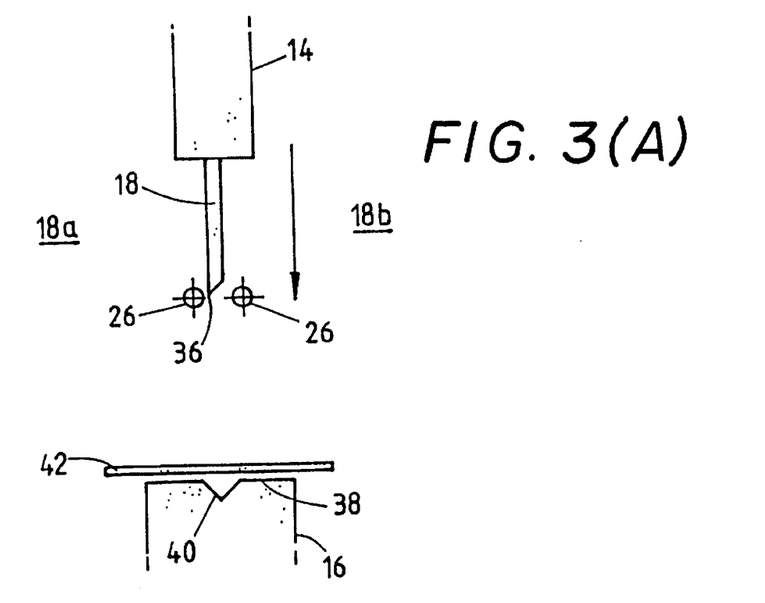
FIG. 3(a), (b) and (c) is a partial side view cross section of the safety apparatus and press brake of FIG. 1 in use.
Figures 3B, 3C:
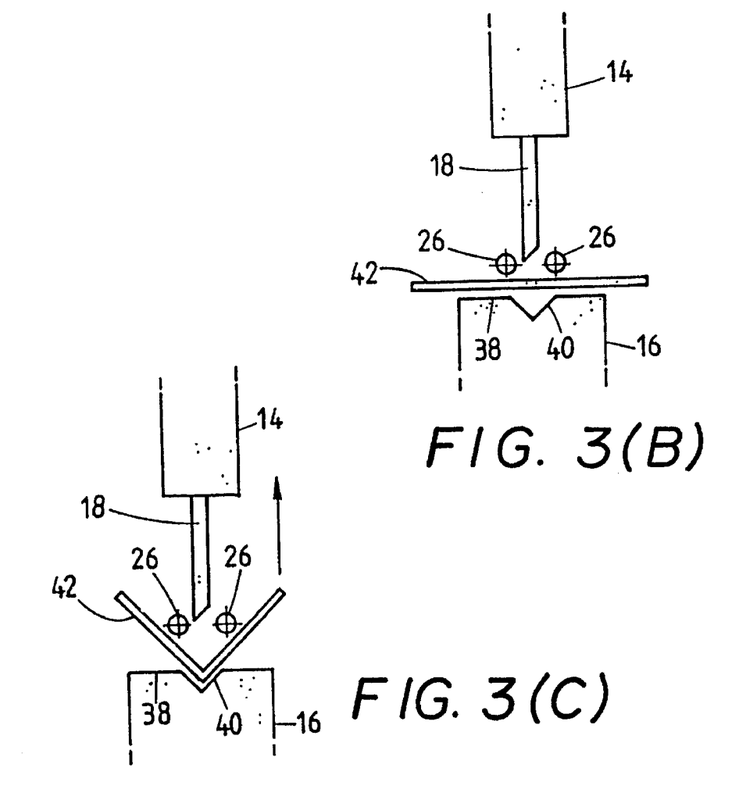
Figure 4A:
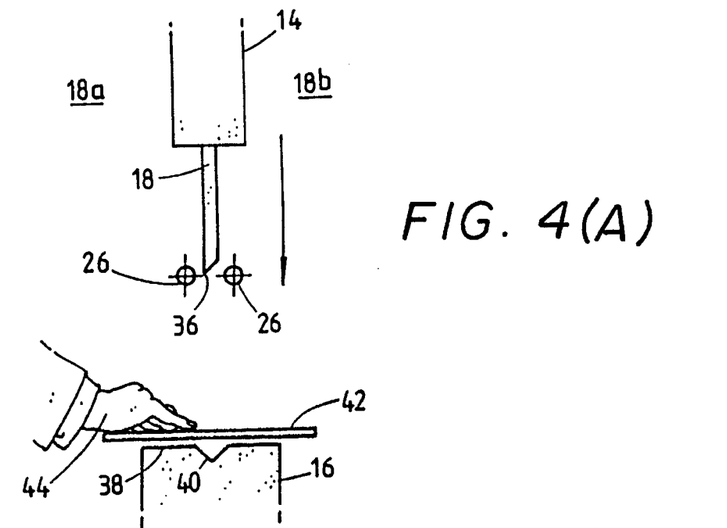
FIG. 4(a),(b) and (c) is a partial side view cross section of the safety apparatus and press brake of FIG. 1 in use.
Figure 4B:
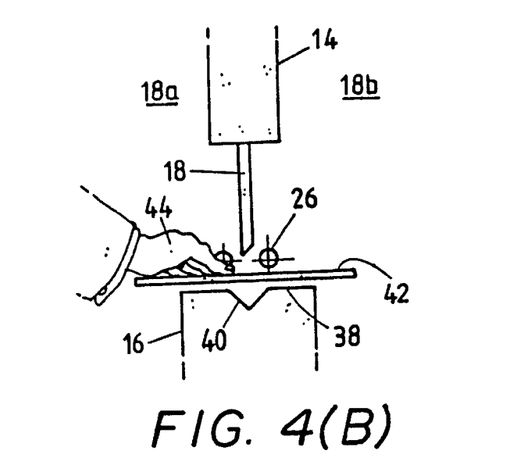
Figure 4C:
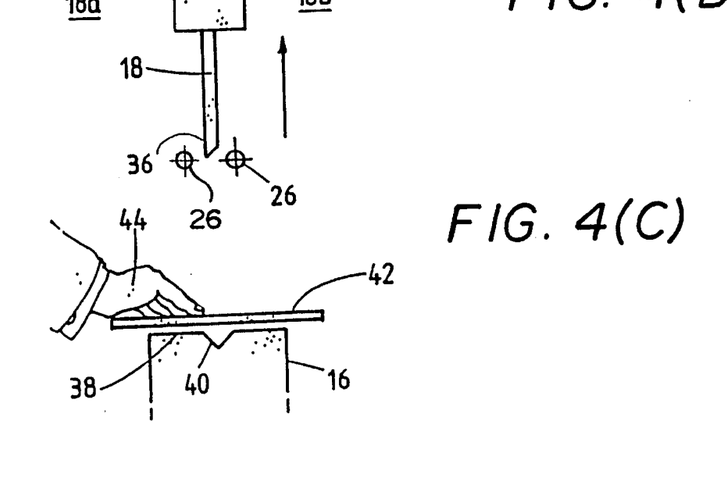

The blade 18 is mounted in a substantially upright manner and a has a leading edge 36, as shown in FIGS. 2 to 4.

The base 16 has a platform 38 having a recess 40 provided therein. An item of material to be pressed into the recess 40, for example a sheet 42 may be provided on the platform 38, as shown in FIGS. 3 and 4. It is to be understood that the recess 40 may take any form required by a user of the press brake 10.

In FIG. 4 there is shown a user's hand 44 manipulating the sheet 42.

Figure 5:
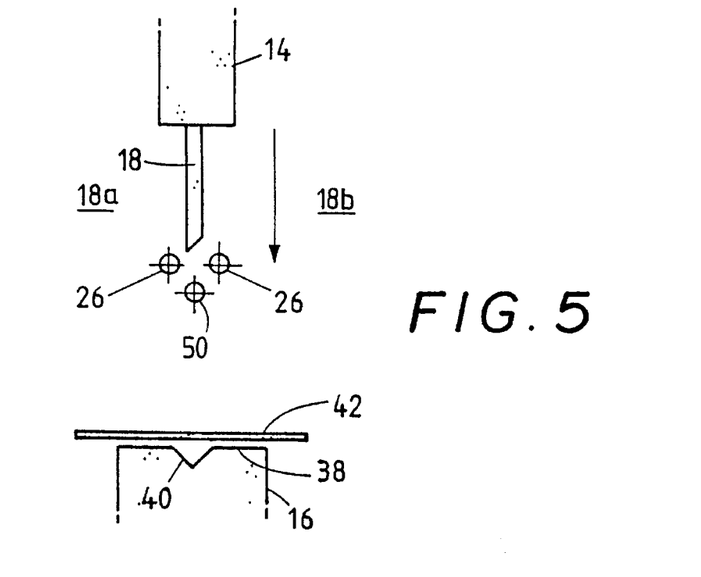
FIG. 5 is a partial side view cross section of the safety apparatus and press brake of FIG. 1 having an additional infa red beam provided thereon.

In FIG. 5 there is shown the blade 18 and platform 38 of FIGS. 3 and 4 having a feeler light beam 50 provided therewith. The feeler beam 50 runs substantially parallel to the blade 18 and is located substantially directly forward of, and spaced apart form, the leading edge 36 thereof.

Figure 6:
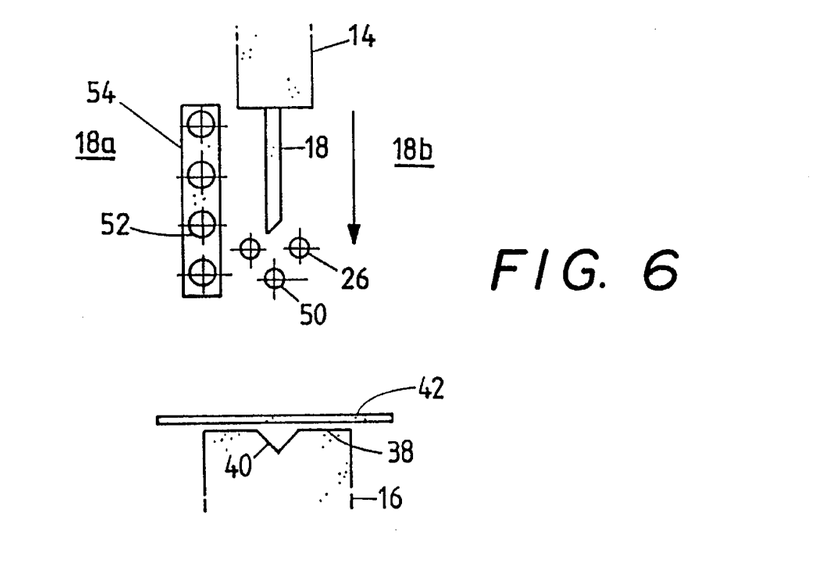
FIG. 6 is a partial side view cross section of the safety apparatus and press brake of FIG. 5 having a number of additional infa red beams provided at the front thereof.

In FIG. 6 there is shown a number of light beams 52 arranged to run substantially parallel to the front 18a of the blade 18 in a vertical configuration forming a sheet 54.

Such a configuration is intended for a blade 18 having a number of sections thereto which are set at differing levels above the platform 38.

Figure 7:
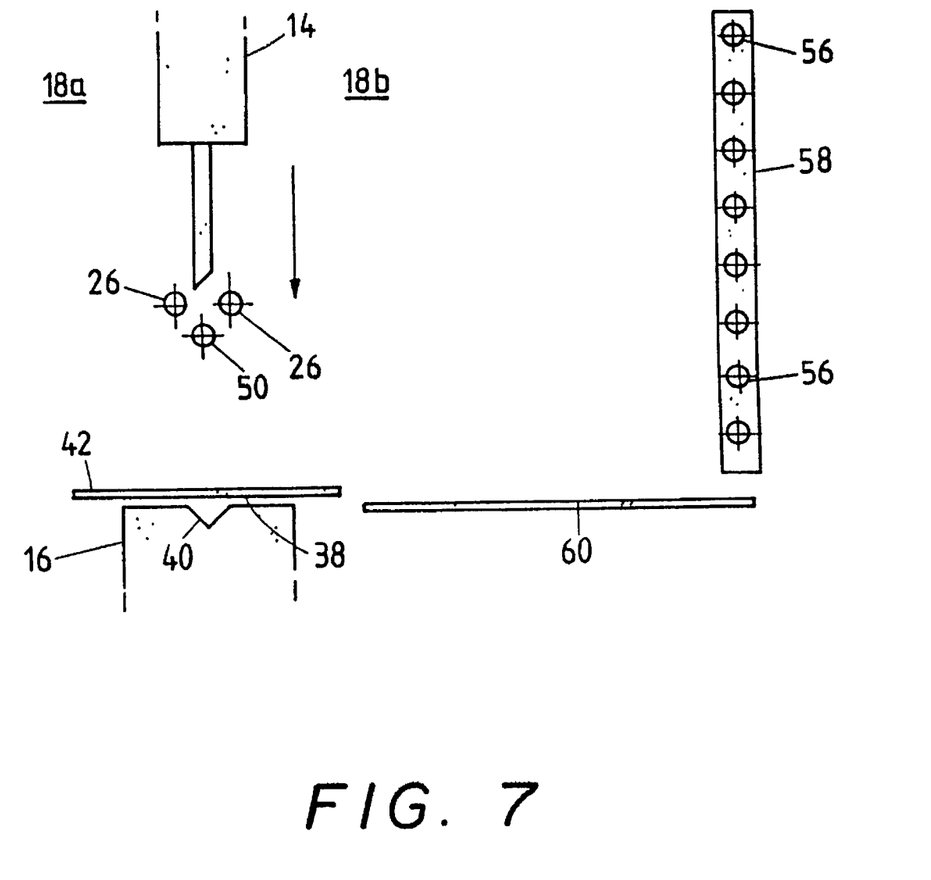
FIG. 7 is a partial side view cross section of the safety apparatus of FIG. 5 having additional fixed rear beams for special sheet profiles.
Figure 8A:
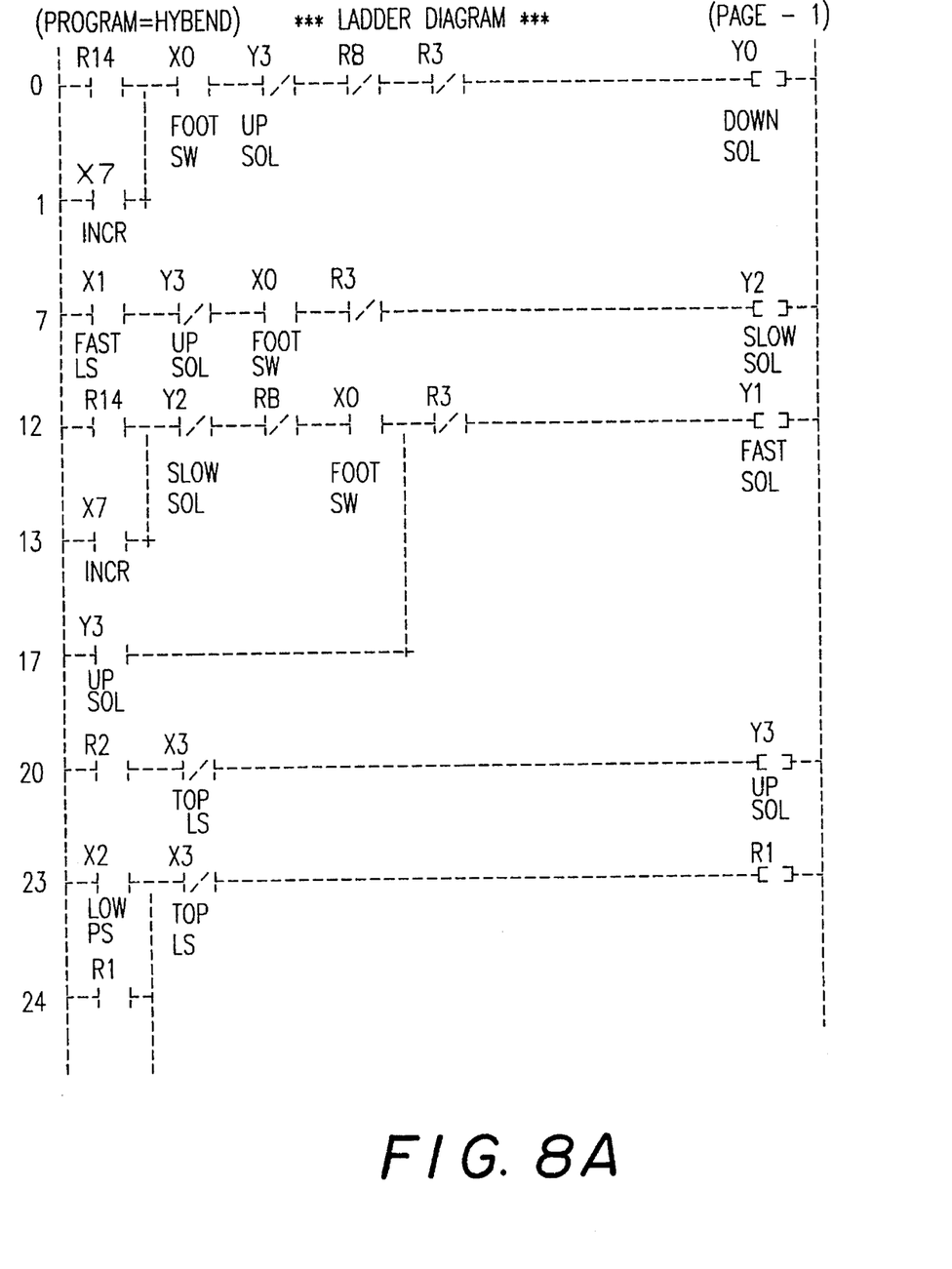
FIG. 8(a)–8(e) show a circuit diagram of a Programmable Logic Collector (PLC) for use in the present invention.
Figure 8B:
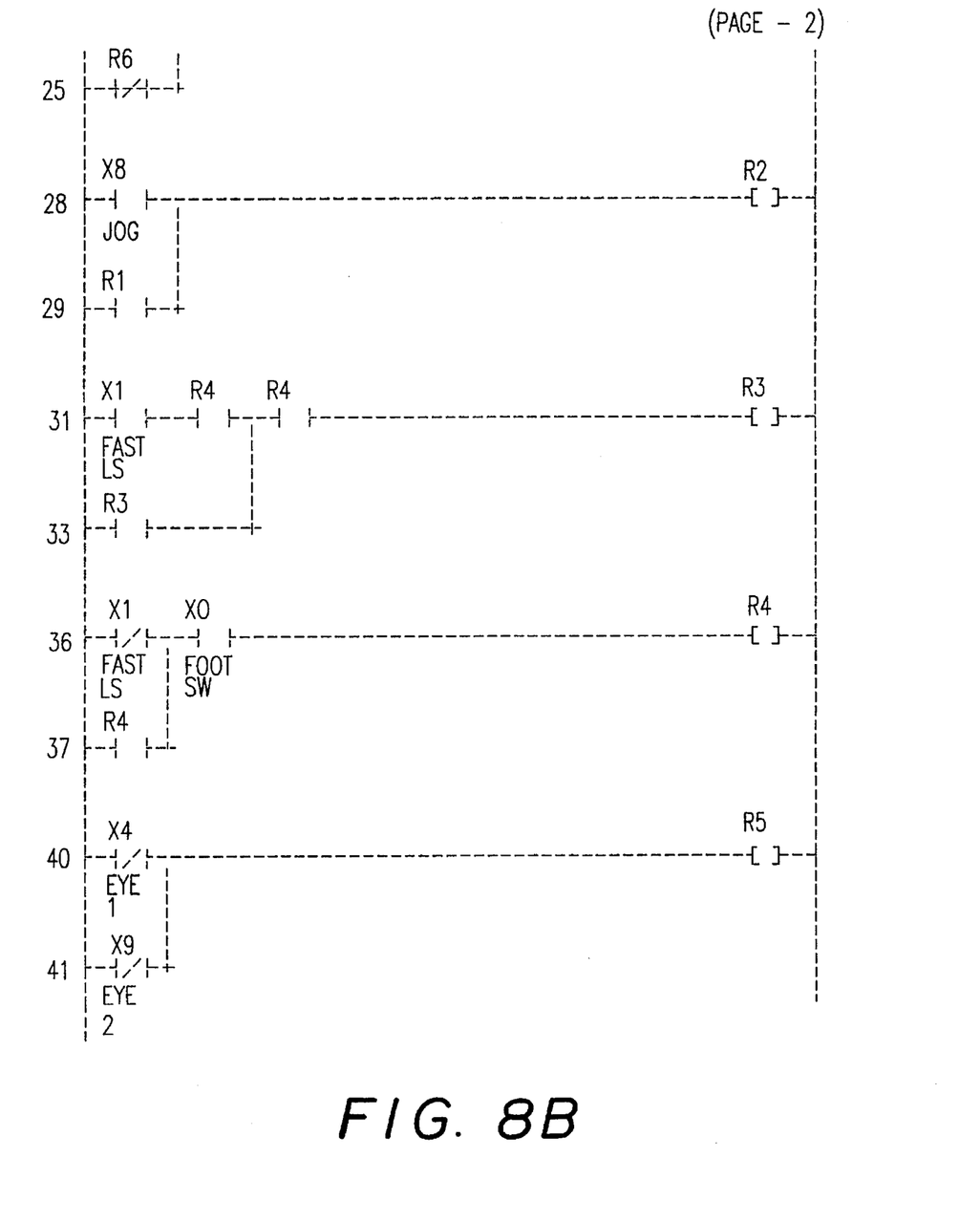
Figure 8C:
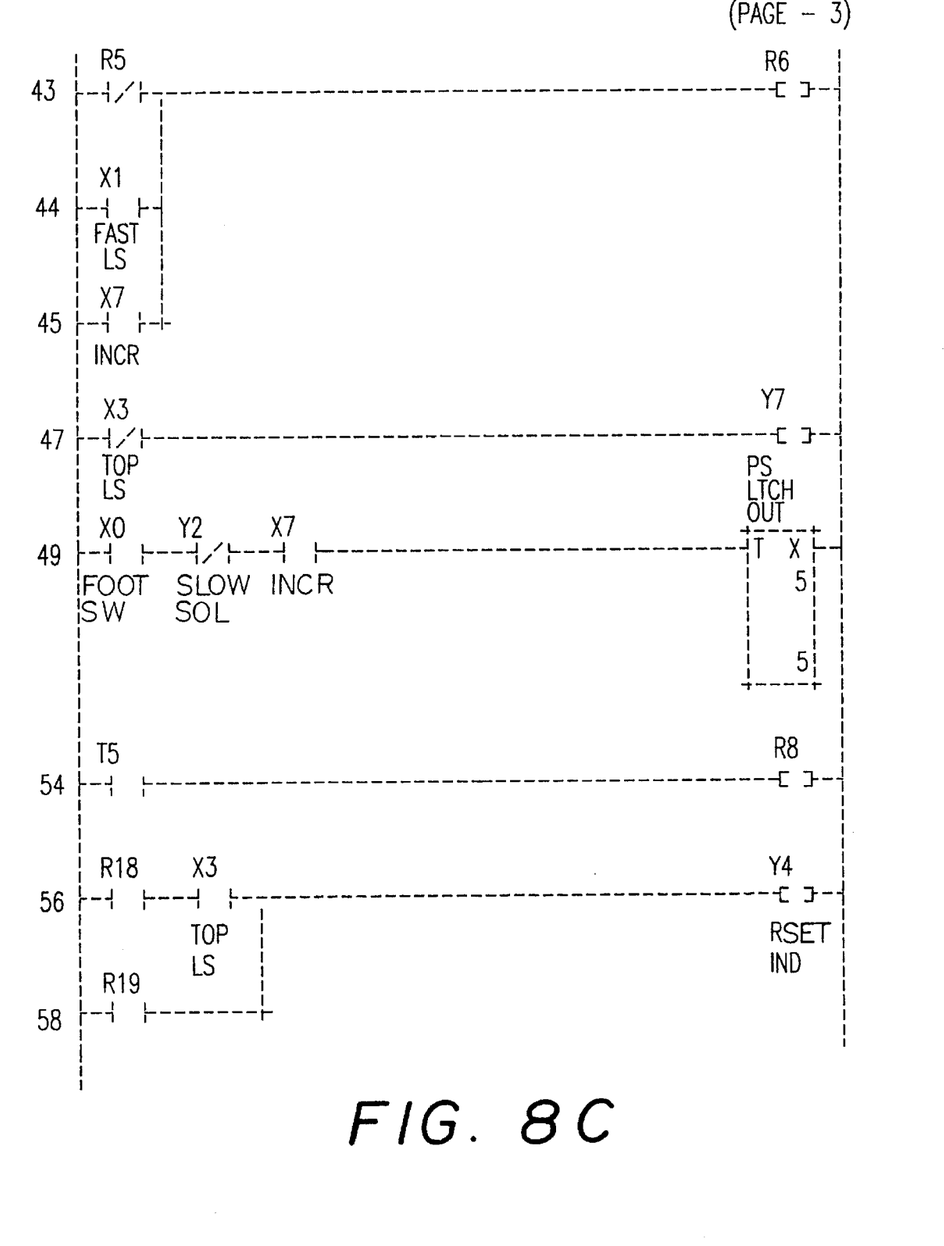
Figure 8D:
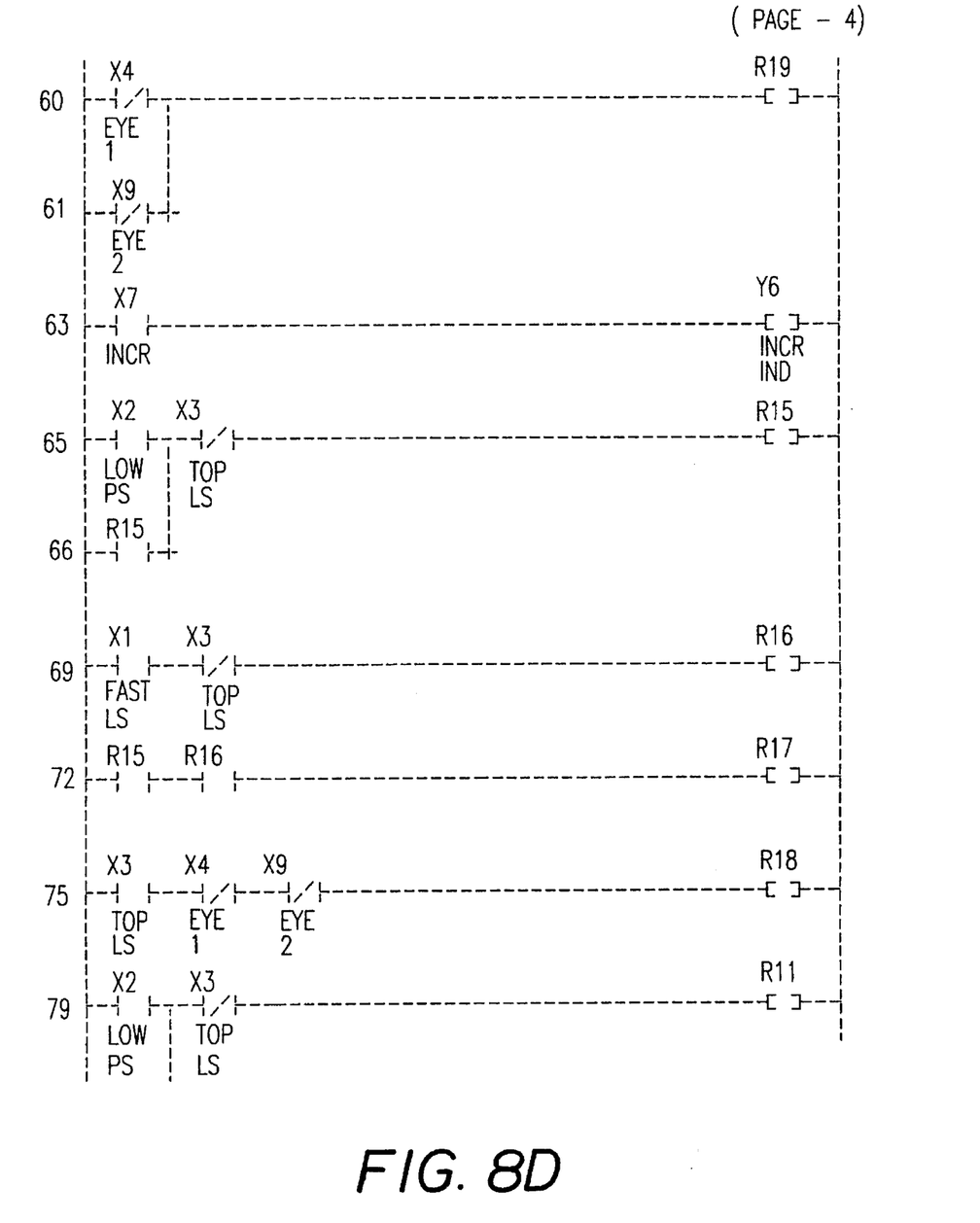
Figure 8E:
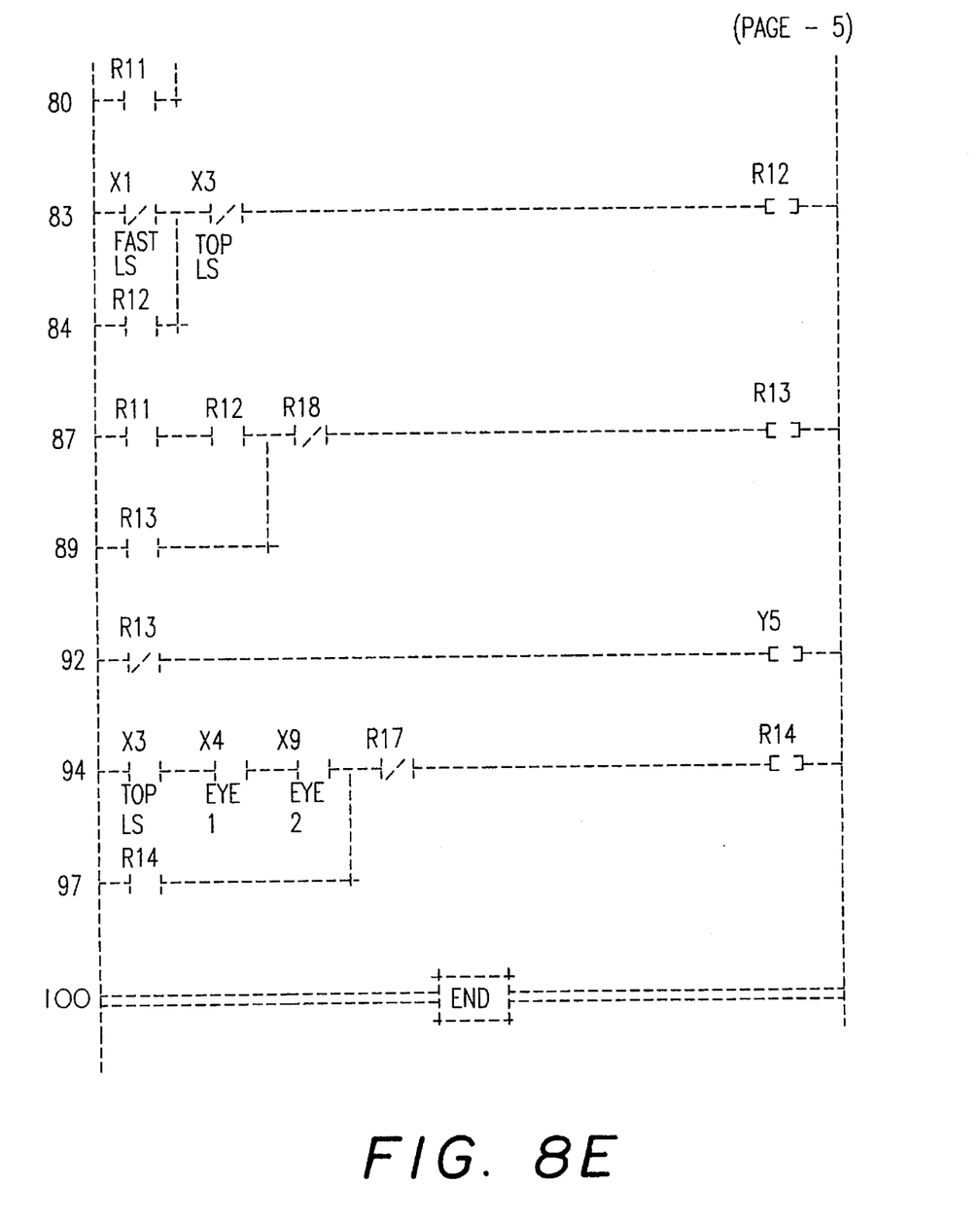

In FIG. 7 there is shown a number of light beams 56 arranged to run substantially parallel to the rear face 18b of the blade. The light beams 56 form a vertically disposed sheet 58 and a horizontally disposed sheet 60.

A form of Programmable Logic Controller (PLC) is provided for the operation of the press brake 10 and associated safety apparatus, as shown in FIG. 8. The PLC is electronically linked to the footswitch 34, the light emitter means 22 and light receiving means 24, the switches 30, the lights 32 and a hydraulic motor (not shown) driving the blade frame 14 and blade 18. This linking is arranged in a manner allowing co-ordination of the operation of the press brake as described in the following paragraphs.

In use, a sheet 42 to be pressed is inserted in the press brake 10 so as to overlay the platform 38, as can be best seen in FIGS. 3(a), 4(a), 5,6 and 7.

Each light emitter means 22 and light receiving means 24 pair is arranged so that the beam 26 therebetween is positioned marginally forward of the leading edge 36 of the blade 18, as can be seen in FIGS. 3,4,5,6 and 7.

Particularly now with reference to FIGS. 3 and 4, upon an initial activation of the footswitch 34, if the beams 26 are uninterrupted, the blade frame 14 will descend from a raised position. Accordingly, the blade 18 and light means 22 and 24 move with the blade frame 14.

When the leading edge 36 of the blade 18 is approximately 8 mm away from the platform 38 the blade frame 14 will stop, as shown in FIG. 3(b), at what is termed the "nip point".

The nip point is set by the user of the press brake 10.

To have the blade 18 contact the sheet 42 an operator must again activate the footswitch 34. At this time, the interruption of the beams 26 is overridden by the PLC allowing contact with the sheet 42 despite the beams 26 being interrupted. After such contact, the blade 18 and associated components return to their raised position while the sheet 42 has been suitably shaped by the interaction of the blade 18 and recess 40, as shown in FIG. 3(c).

If either or both of the beams 26 are interrupted after initial activation of the footswitch 34, say for example by a user's hand 44, the blade 18 and associated components will firstly stop and then return to their initial raised position, as can be seen in FIG. 4.

The interruption of either or both beams 26 by any obstruction will cause the lights 32 to activate.

If one or more light means 22 and 24 are misaligned the blade 18 and associated components will return to the raised position and cause activation of the lights 32. It may be necessary to over-ride the normal operation described above, for example during set-up of the brake press 10. This may be accomplished by activating one or more switches 30. In this condition, the blade 18 and associated components may only advance by a predetermined distance, for example 10 mm, upon each activation of the footswitch 34. Each of the above functions is provided for by the Programmable Logic Controller (PLC), as shown in FIG. 5. Accordingly, the integers of the PLC are arranged and interconnected in a manner that allows, amongst other functions, the return of the blade 18 and associated components to the raised position upon interruption of a single or both beams 26.

The addition of the feeler beam 50 as seen in FIGS. 5 to 7 allows breaking of it to stop descent of the blade frame 14 and blade 18. As such, it is not possible for a user to set a nip point on the press brake 10 that is smaller than the distance of the feeler beam 50 from the leading edge 36 of the blade.

The addition of the sheet 54 of beams 52, as can be seen in FIG. 6, allows interruption of these beams 52 to stop the blade 18. Such an arrangement is envisaged to be necessary if the blade 18 comprises a number of sections and where at least two thereof are set at differing levels above the platform 38. This would require two or more nip points corresponding to the two or more levels of sections comprising the blade 18. Once a first nip point was reached and it became necessary to override the interruption of beams 50 and 26 to allow contact of the blade 18 and the sheet 42 it is possible that a user may insert his hand 44 between the sheet 42 and a following nip point. If this was to happen then the interruption of beams 52 will halt the blade 18 and return it and its associated components to their raised position.

The addition of the beams 56 forming a sheet 58 and a mechanical barrier 60 protect against access to the blade 18 from the rear 18b thereof, as can be seen in FIG. 7. Interruption of the beams 56 results also in the stopping of the descent of the blade 18 and returns it and its associated components to their raised position.

It is envisaged that infra-red light or laser (Light Amplification by Stimulated Emission of Radiation) light may be used to form the beams 26, 50, 52 and 56.

It is also envisaged that the pairs of opposed light emitter means 22 and light receiving means 24 may be replaced by a single means capable of both emitting and receiving a light beam in combination with a reflective or mirror means located opposite thereto. One of these units could be mourned either side of the blade 18.

Still further, it is to be understood that any obstruction, and not only a users hand 44 interrupting the beams 26 will cause the descent of the blade 18 to stop.

The arrangement of the present invention allows an operator to work close to the blade 18 without being able to entrap his or her hands between the blade 18 and sheet 42 or platform 38. In addition, the rear of the press brake need not be enclosed by mechanical and physical barriers which restrict access thereto.

The non-incremental form of movement of the blade 18 in normal operation reduces stress on machine hydraulics and continuous activation of the foot switch 34.

Modifications and variations such as would be apparent to a skilled addressee are deemed within the scope of the present invention.

I claim:

1. A safety apparatus for use with a press brake of the kind having a moving blade provided with a leading edge and a platform against which an item may be pressed, the safety apparatus including:

a plurality of corresponding light-emitting means and light-receiving means for mounting in fixed relationship with the leading edge of the moving blade, so as to move in conjunction with the blade, one of said light-emitting means being for mounting at one end of the moving blade forwardly and laterally of the leading edge, and the corresponding light-receiving means being for mounting at the opposing end of the moving blade;

said light-emitting means being adapted for emitting a beam of light in parallel and substantially forward and lateral prescribed relationship to the leading edge and said corresponding light-receiving means being adapted to receive the beam of light;

control means for sensing receipt of the emitted beams by said light-receiving means for halting operation of the press brake, wherein said control means causes the cessation of movement of the blade in response to a sensed interruption of receipt of an emitted beam; said control means including means for overriding the halting of the press brake by said control means after the blade descends to a predetermined position, so that control means does not respond to subsequent interruptions of the emitted light beam;

characterised in that the light beam of one light-emitting means is to be disposed to the operator side of the press brake and the light beam of another light-emitting means is to be disposed to the remote side of the press brake.

2. A press brake safety apparatus according to claim 1, in which the movement of the blade halts automatically at a predetermined level or nip point above the platform and whereby for the blade to move beyond this level it is necessary that a user of the brake press perform a manual operation.

3. A press brake safety apparatus according to claim 1, in which the movement of the blade halts automatically at a predetermined level or nip point above the platform and whereby for the blade to move beyond this level it is necessary that a user of the brake press perform a manual operation, wherein there is provided a further beam located directly forward of and spaced apart from the leading edge of the blade, interruption of the further beam by the item or platform thereby halting movement of the blade, the level above the platform at which the blade is halted being predetermined ensuring that the nip point is a predetermined distance from the item or platform.

4. A press brake safety apparatus according to claim 1, in which the beam or beams are generated by a light emitter means and received in a light receiver means each rigidly linked to the blade and moving therewith.

5. A press brake safety apparatus according to anyone of claim 1, in which the beam or beams are generated and received in a single means capable of both emitting and receiving a light beam, the single means rigidly linked to one end of the blade and a reflective or mirror means rigidly linked to the other end thereof and thereby opposing the single means.

6. A press brake safety apparatus according to claim 1, in which additional beams are provided at either or both a front and/or rear of the blade thereby further limiting access thereto, the interruption of said additional beams causing halting of the blades movement.

7. A press brake safety apparatus according to claim 1, in which there is provided a form of Programmable Logic Controller (PLC) electronically linked to the or each beam and to a motor driving movement in the beam the Programmable Logic Controller (PLC) facilitating the halting of movement of the blade upon interruption of the or each beam.

8. An apparatus comprising:

a press brake having a moving blade provided with a leading edge, said blade having opposite ends and opposite sides, and a platform against which an item may be pressed; and a safety apparatus including: first and second light sources operable to direct corresponding first and second light beams to corresponding first and second light receivers, said first and second light beams extending on opposite sides of the blade parallel, forward and lateral relative to the leading edge, said first and second light sources and said first and second light receivers all mounted in fixed relationship with the leading edge of the moving blade such that each of the first and second light sources and first and second light receivers moves in conjunction with the blade,; control means for sensing receipt of the first and second light beams by said first and second light receivers and operable to halt movement of the blade in response to a sensed interruption of receipt of either of the first and second beams, said control means including means for overriding the halting of the press brake by said control means after the blade descends to a predetermined position, so that said control means does not respond to subsequent interruptions of the emitted light beam; and wherein the first light beam is disposed to an operator side of the press brake and the second light beam is disposed to a remote side of the press brake.

9. The apparatus of claim 8 wherein said first light source and first light receiver are mounted at opposite ends of the moving blade forwardly and laterally of the leading edge, and said second light source and second light receiver are mounted at opposite ends of the moving blade forwardly and laterally of the leading edge.

* * * * *